United States Patent
Razavi et al.

(10) Patent No.: US 6,559,089 B1
(45) Date of Patent: May 6, 2003

(54) METALLOCENE CATALYST COMPONENT FOR USE IN PRODUCING ISOTACTIC POLYOLEFINS

(75) Inventors: Abbas Razavi, Mons (BE); Vincenzo Bellia, Maurage (BE)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/424,416

(22) PCT Filed: May 26, 1998

(86) PCT No.: PCT/EP98/03099

§ 371 (c)(1),
(2), (4) Date: Feb. 15, 2000

(87) PCT Pub. No.: WO98/54230

PCT Pub. Date: Dec. 3, 1998

(30) Foreign Application Priority Data

May 26, 1997 (EP) .............................................. 97108467

(51) Int. Cl.$^7$ ................................................ B01J 31/00
(52) U.S. Cl. ................... 502/152; 502/103; 526/160; 526/351; 526/169.2; 526/158; 526/159; 526/943; 556/11; 556/43; 556/53
(58) Field of Search .................. 526/160, 943, 526/351, 169.2, 158, 159; 502/152, 103; 556/11, 43, 53

(56) References Cited

U.S. PATENT DOCUMENTS 5,459,117 A  10/1995  Ewen ......................... 502/117
5,631,202 A  * 5/1997  Ewen ......................... 502/117

FOREIGN PATENT DOCUMENTS

EP   0537130   4/1993
EP   0693497   1/1996
EP   0747406   12/1996

* cited by examiner

Primary Examiner—David W. Wu
Assistant Examiner—Ling-Siu Choi
(74) Attorney, Agent, or Firm—David J. Alexander; J M. (Mark) Gilbreth; Mary A. Gilbreth

(57) ABSTRACT

Provided is a metallocene catalyst component for use if preparing isotactic polyolefins, which component has the general formula (I): R" (CpR$^1$R$^2$R$^3$)(Cp'R'n) MQ$^2$ wherein Cp is a substituted cyclopentadienyl ring; Cp' is substituted or unsubstituted fluorenyl ring; R" is a structural bridge imparting stereorigidity to the component; R$^1$ is a substituent on the cyclopentadienyl ring which is distal to the bridge, which distal substituent comprises a bulky group of the formula XR$^*_3$ in which X is chosen from Group IVA, and each R$^*$ is the same or different and chosen from hydrogen or hydrocarbyl of from 1 to 20 carbon atoms, R$^2$ is substituent on the cyclopentadienyl ring which is proximal to the bridge and positioned non-vincinal to the distal substituent, and is of the formula YR$^\#_3$, in which Y is chosen from Group IVA, and each R$^\#$ is the same or different and chosen from hydrogen or hydrocarbyl of 1 to 7 carbon atoms, R$^3$ is a substituent on the cyclopentadienyl ring which is proximal to the bridge and is a hydrogen atom or is of the formula ZR$^\$_3$, in which Z is chosen from Group IVA, and each R$^\$$ is the same or different and chosen from hydrogen or hydrocarbyl of 1 to 7 carbon atoms, each R' is the same or different and is hydrocarbyl having 1 to 20 carbon atoms in which $0 \leq n \leq 8$; M is a Group IVB transition metal or vanadium; and each Q is hydrocarbyl having 1 to 20 carbon atoms or is a halogen.

81 Claims, 3 Drawing Sheets

METALLOCENE CATALYST COMPONENT FOR USE IN PRODUCING ISOTACTIC POLYOLEFINS

The present invention relates to a metallocene catalyst component for use in preparing isotactic polyolefins, especially polypropylenes. The invention further relates to a catalyst system which incorporates the metallocene catalyst component and a process for preparing such isotactic polyolefins.

Olefins having 3 or more carbon atoms can be polymerised to produce a polymer with an isotactic stereochemical configuration. For example, in the polymerisation of propylene to form polypropylene, the isotactic structure is typically described as having methyl groups attached to the tertiary carbon atoms of successive monomeric units on the same side of a hypothetical plane through the main chain of the polymer. This can be described using the Fischer projection formula as follows:

Another way of describing the structure is through the use of NMR spectroscopy. Bovey's NMR nomenclature for an isotactic pentad is . . . mmmm with each "m" representing a "meso" diad or successive methyl groups on the same side in the plane.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is described as follows:

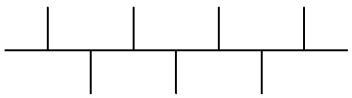

In NMR nomenclature, a syndiotactic pentad is described as . . . rrr . . . in which "r" represents a "racemic" diad with successive methyl groups on alternate sides of the plane.

In contrast to isotactic and syndiotactic polymers, an atactic polymer exhibits no regular order of repeating unit. Unlike syndiotactic or isotactic polymers, an atactic polymer is not crystalline and forms essentially a waxy product.

While it is possible for a catalyst to produce all three types of polymer, it is desirable for a catalyst to produce predominantly an isotactic or syndiotactic polymer with very little atactic polymer. $C_2$-symmetric metallocene catalysts are known in the production of the polyolefins. For example, C2 symmetric bis indenyl type zirconocenes which can produce high molecular weight high melting isotactic polypropylene. The preparation of this metallocene catalyst is costly and time-consuming, however. Most importantly, the final catalyst consists of a mixture of racemic and meso isomers in an often unfavourable ratio. The meso stereoisomer has to be separated to avoid the formation of atactic polypropylene during the polymerisation reaction.

EP-A-0537130 discloses the use of a C1 symmetric metallocene catalysts for the production of isotactic polypropylene. A preferred catalyst is isopropylidene (3-t-butyl-cyclopentadienyl fluorenyl)ZrCl$_2$. This catalyst has a bulky t-butyl group positioned on the cyclopentadienyl ring distal to the isopropylidene bridge. This catalyst has the advantage that it consists of only one stereoisomer and so no isomeric metallocene separation is required at the final stage of its synthesis. Whilst polypropylene preparation using this catalyst produces isotactic polypropylene, the polymer product has poor mechanical properties because of the presence of regiodefects and relatively low molecular weight.

Regiodefects occur in the polymer chain when, instead of producing a perfect isotactic polyolefin in which each monomeric unit is positioned head-to-tail in relation to the next, mis-insertions of the monomers occur so as to give either a head-to-head or tail-to-tail mis-match. In the polymerisation process according to EP-A-0619325, there is a typical mis-insertion frequency of around 0.4%. These so called (2-1) regiodefects are partially transferred to the so called (1-3) insertion through an isomerisation process leaving units of four $CH_2$ groups in the backbone of the polypropylene chain. This has a deleterious effect on the physical and mechanical properties of the polymer and results in low molecular weight isotactic polypropylene with a low melting point.

The present invention aims to overcome the disadvantages of the prior art.

In a first aspect, the present invention provides a metallocene catalyst component for use in preparing isotactic polyolefins, which component has the general formula:

$$R''(C_pR_1R_2R_3)(C_p'R'_n)MQ_2 \quad (I)$$

wherein $C_p$ is a substituted cyclopentadienyl ring; $C'_p$ is a substituted or unsubstituted fluorenyl ring; R" is a structural bridge imparting stereorigidity to the component; $R_1$ is a substituent on the cyclopentadienyl ring which is distal to the bridge, which distal substituent comprises a bulky group of the formula $XR^*_3$ in which X is chosen from Group IVA, and each R* is the same or different and chosen from hydrogen or hydrocarbyl of from 1 to 20 carbon atoms, $R_2$ is a substituent on the cyclopentadienyl ring which is proximal to the bridge and positioned non-vicinal to the distal substituent, and is of the formula $YR\#_3$, in which Y is chosen from group IVA, and each R@ is the same or different and chosen from hydrogen or hydrocarbyl of 1 to 7 carbon atoms, $R_3$ is a substituent on the cyclopentadienyl ring which is proximal to the bridge and is a hydrogen atom or is of the formula $ZR\$_3$, in which Z is chosen from group IVA, preferably carbon, and each R$ is the same or different and chosen from hydrogen or hydrocarbyl of 1 to 7 carbon atoms, each $R'_n$ is the same or different and is hydrocarbyl having 1 to 20 carbon atoms in which $0 \leq n \leq 8$; M is a Group IVB transition metal or vanadium; and each Q is hydrocarbyl having 1 to 20 carbon atoms or is a halogen. In one embodiment, the metallocene catalyst component of the present invention has the general formula:

$$R''(C_pR_1R_2R_3)(C_p'R'_n)MQ_2 \quad (II)$$

wherein $C_p$ is a substituted cyclopentadienyl ring; $C_p'$ is a substituted or unsubstituted fluorenyl ring; R" is a structural bridge imparting stereorigidity to the component; $R_1$ is a substituent on the cyclopentadienyl ring which is distal to the bridge, which distal substituent comprises a group of the formula $XR^*_3$; in which X is chosen from Group IVA, preferably carbon or silicon, and each R* is the same or different and chosen from hydrogen or hydrocarbyl of from 1 to 20 carbon atoms, $R_2$ is a substituent on the cyclopentadienyl ring which is proximal to the bridge and positioned non-vicinal to the distal substituent and is of the formula $YR\#_3$ in which Y is chosen from group IVA, preferably carbon, and each R# is the same or different and chosen from hydrogen or hydrocarbyl of 1 to 7 carbon each $R'_n$, is the same or different and is hydrocarbyl having 1 to 20 carbon atoms in which hydrocarbyl having 1 to 20 carbon atoms in which $0 \leq n \leq 8$; is a Group IVB transition metal or vanadium; and each Q is hydrocarbyl having 1 to 20 carbon atoms or is a halogen.

Polyolefins produced using metallocene catalyst component of the present invention are not only found to be isotactic but are also found to be substantially free of regiodefects. Accordingly, the polyolefins produced thereby have improved mechanical properties including a high weight average molecular weight typically of the order of 150,000–600,000 and elevated melting point. Without wishing to be bound by any theory, it is postulated that the bulky group on the cyclopentadienyl ring contributes to the stereospecificity of the polymerisation reaction whereas the proximal substituent(s) on the cyclopentadienyl ring contribute to the regiospecificity of monomer insertion and the increase of molecular weight.

In the bulky distal substituent group $R_1$, X is preferably C or Si. R* may be a hydrocarbyl such as alkyl, aryl, alkenyl, alkylaryl or aryl alkyl, preferably methyl, ethyl, propyl, isopropyl, butyl, isobutyl, amyl, isoamyl, hexyl, heptyl, octyl, nonyl, decyl, cetyl or phenyl. RI may comprise a hydrocarbyl which is attached to a single carbon atom in the cyclopentadienyl ring or may be bonded to two carbon atoms in that ring. Preferably, $R_1$ is $C(CH_3)_3$, $C(CH_3)_2Ph$, $CPh_3$ or $Si(CH_3)_3$, most preferably $C(CH_3)_3$.

The proximal substituents $R_2$ and $R_3$ are preferably $CH_3$.

The structural bridge R" is preferably alkylidene having 1 to 20 aliphatic or aromatic carbon atoms, a dialkyl germanium or silicon or siloxane, alkyl phosphene or amine bridging the two $C_p$ rings. R" is preferably dimethylsilanediyl in which the two $C_p$ rings are bridged by the silicon atom, or isopropylidene in which the two $C_p$ rings are bridged by position 2 of the isopropylidene.

M is preferably zirconium or titanium, most preferably zironium. Q may be a hydrocarbyl such as alkyl, aryl, alkenyl, alkylaryl or aryl alkyl, preferably methyl, ethyl, propyl, isopropyl, butyl, isobutyl, amyl, isoamyl, hexyl, heptyl, octyl, nonyl, decyl, cetyl or phenyl. Q is preferably a halogen.

The fluorenyl ring $C_p'$ can have up to 8 substituent groups $R'_n$, each of which is the same or different and may be a hydrocarbyl selected from alkyl, aryl, alkenyl, alkyl aryl or aryl alkyl, such as methyl, ethyl, propyl, isopropyl, butyl, isobutyl, amyl, isoamyl, hexyl, heptyl, octyl, nonyl, decyl, cetyl or phenyl. These substituents must be selected so that they do not interfere with coordination of the monomer to the metal. Preferably, therefore, the fluorenyl ring is unsubstituted at both positions 4 and 5, these positions being distal to the bridge.

In a further aspect, the present invention provides a metallocene catalyst component for use in preparing isotactic polyolefins, which comprises (i) a catalyst component as defined above; and (ii) a regioisomer thereof in which $R_2$ is proximal to the bridge and positioned vicinal to the distal substituent.

Such regioisomers are frequently relatively easy to prepare because they are formed as a "by-product" during the synthetic route by which the catalyst component (i) may be made.

Surprisingly, it has been found that catalyst components including both regioisomers can be used in the preparation of isotactic polyolefins which have a multimodal, especially a bimodal, molecular weight distribution.

In a further aspect, the present invention provides a catalyst system for use in preparing isotactic polyolefins, which comprises (a) a catalyst component as defined above; and (b) an aluminium- or boron-containing co-catalyst capable of activating the catalyst component. Suitable aluminium-containing co-catalysts comprise an alumoxane, an alkyl aluminium and/or a Lewis acid.

The alumoxanes usable in the process of the present invention are well known and preferably comprise oligomeric linear and/or cyclic alkyl alumoxanes represented by the formula:

(I)

for oligomeric, linear alumoxanes and

(II)

for oligomeric, cyclic alumoxane, wherein n is 1–40, preferably 10–20, m is 3–40, preferably 3–20 and R is a $C_1$–$C_8$ alkyl group and preferably methyl. Generally, in the preparation of alumoxanes from, for example, aluminium trimethyl and water, a mixture of linear and cyclic compounds is obtained.

Suitable boron-containing co-catalysts may comprise a triphenylcarbenium boronate such as tetrakispentafluorophenyl-borato-triphenylcarbenium as described in EP-A-0427696, or those of the general formula [L'—H]+[B Ar$_1$ Ar$_2$ X$_3$ X$_4$]— as described in EP-A-0277004 (page 6, line 30 to page 7, line 7)

The catalyst system may be employed in a solution polymerisation process, which is homogeneous, or a slurry process, which is heterogeneous. In a solution process, typical solvents include hydrocarbons with 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalised polyolefins such as finely divided polyethylene.

Preferably, the support is a silica having a surface area comprised between 200 and 700 $M^2/g$ and a pore volume comprised between 0.5 and 3 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane, and aromatics such as benzene, toluene, ethylbenzene and diethylbenzene.

Preferably the support material is slurried in toluene and the metallocene and alumoxane are dissolved in toluene prior to addition to the support material.

In a further aspect, the present invention provides use of a catalyst component as defined above and a co-catalyst which activates the catalyst component, for the preparation of isotactic polyolefins, preferably polypropylenes. In a still further aspect, the present invention provides use of a metallocene catalyst component comprising (i) the catalytic component and (ii) a regioisomer thereof, in which $R_2$ is proximal to the bridge and positioned vicinal to the distal substituent, for the preparation of isotactic polyolefins, especially polypropylenes, having a multimodal molecular weight distribution, preferably a bimodal molecular weight distribution.

In a further aspect, the present invention provides a process for preparing isotactic polyolefins, especially polypropylenes, which comprises contacting a catalyst system as defined above with at least one olefin, preferably propylene, in a reaction zone under polymerisation conditions.

The catalyst component may be prepared by any suitable method known in the art. Generally, the preparation of the catalyst component comprises forming and isolating bridged dicyclopentadiene, which is then reacted with a halogenated metal to form the bridged metallocene catalyst.

In one embodiment, the process for preparing the bridged metallocene catalyst components comprises contacting a substituted cyclopentadiene having bulky and non bulky substituents on the cyclopentadienyl ring with a fluorene under reaction conditions sufficient to produce a bridged substituted dicyclopentadiene. The process further comprises contacting the bridged substituted dicyclopentadiene with a metal compound of the formula $MQ_k$ as defined above under reaction conditions sufficient to complex the bridged dicyclopentadiene to produce a bridged metallocene wherein M and Q are each defined as above and $0 \leq k \leq 4$. The process step of contacting the bridged substituted dicyclopentadiene with a metal compound can be performed in a chlorinated solvent.

In a further embodiment, the process comprises contacting a substituted cyclopentadiene having bulky and non bulky substituents on the cyclopentadienyl ring with an alkyl silyl chloride of the formula $R_2SiHal_2$ wherein R is a hydrocarbyl having 1 to 20 carbon atoms and Hal is a halogen. A second equivalent of an optionally substituted fluorene is added to produce a silicon bridged substituted cyclopentadienyl fluorenyl ligand. The subs=quent steps are similar to those above for producing a bridge disubstituted cyclopentadienyl-fluorenyl ligand coordinated to metals such as Zr, Hf and Ti.

In a further embodiment, the process comprises contacting a substituted cyclopentadiene with a fulvene producing agent such as acetone to produce a substituted fulvene. Subsequently, in a second step, the fulvene is reacted with fluorene to produce a carbon bridged substituted cyclopentadienyl-fluorenyl ligand that will produce the desired metallocene catalysts after reacting with $MCl_4$, in which M is Zr, Hf or Ti.

BRIEF DESCRIPTION OF DRAWINGS

The invention will now be described in further detail, by way of example only, with reference to the attached drawings in which.

EXAMPLE 1

Figure 1:
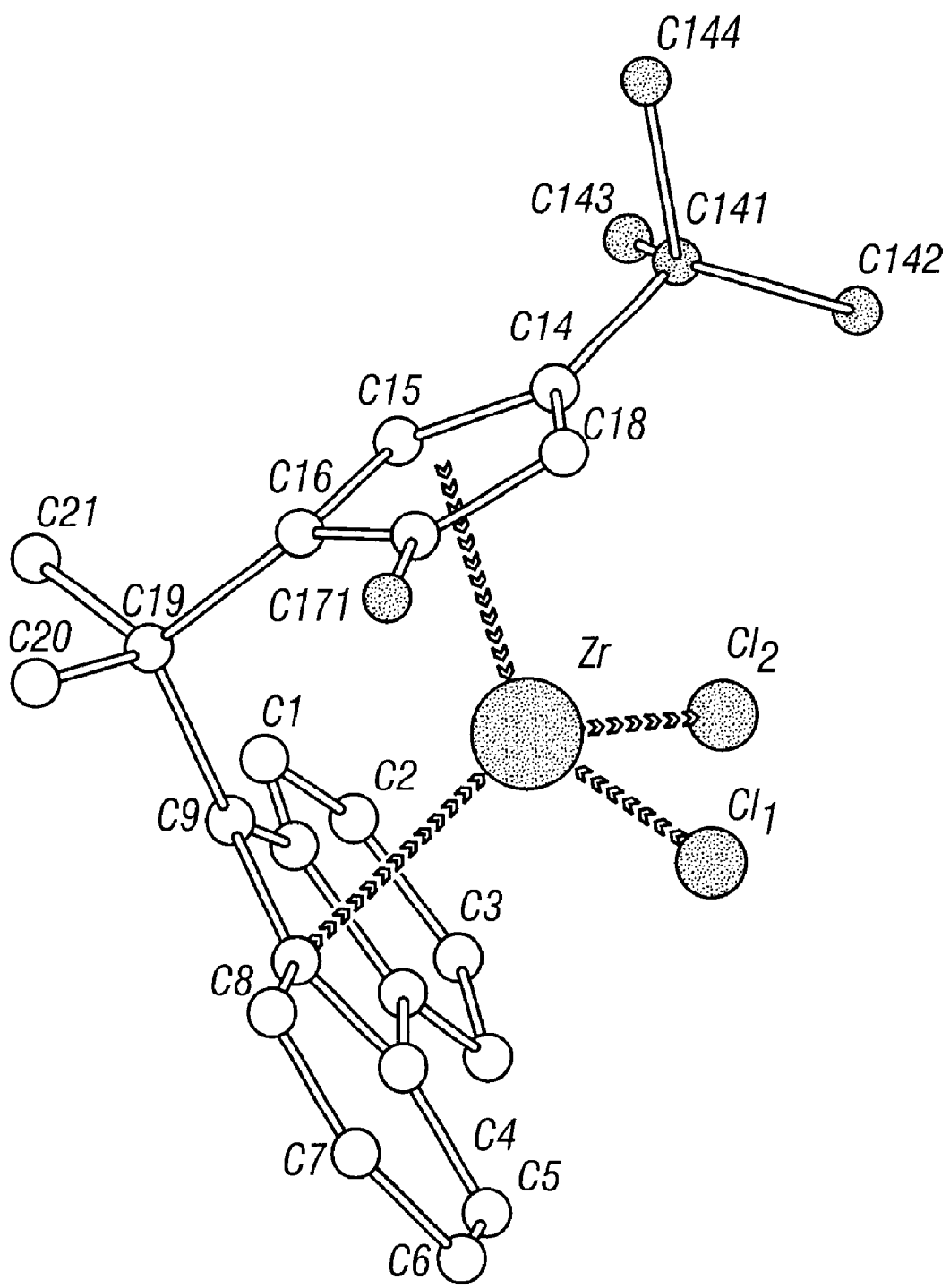
FIG. 1 shows an illustration of the three-dimensional structure of a preferred catalyst component of the present invention as obtained by X-ray diffraction analysis of isopropylidene (3-tert.butyl-5-methyl cyclopentadienyl-fluorenyl) $ZrCl_2$.

Synthesis of isopropylidene(3-t-butyl-5-methylcyclopentadienyl fluorenyl)$ZrCl_2$ A) Synthesis of the trimethyl fulvene In a round bottom flask equipped with magnetic stirring bar and nitrogen inlet is placed 350 ml of methanol (at −78° C.) containing freshly prepared methylcyclopentadiene under nitrogen. To this solution is added a solution of 28.6 g of acetone in 50 ml of methanol drop wise. Subsequently 52.5 g of pyrrolidine is added. The reaction mixture is stirred at ambient temperature for 24 hours. After neutralization with acetic acid and separation of the organic phase the solvent is evaporated and the remaining yellow oil is subjected to distillation. A mixture of 6,6,3-tritethyl fulvene and 6,6,5,-trimethyl fulvene is obtained in 65% yield.

B) Synthesis of methyl-t-butyl-cyclopentadiene

The product obtained in step A is placed in 21 flask and dissolved in 350 ml of diethyl ether and cooled down to 0° C. To the solution is added drop wise 140.6 ml of methyl lithium in ether (1.6 mol). The reaction is completed after a few hours. After adding 40 ml of saturated solution of $NH_4Cl$ in water the organic phase is separated and dried with $MgSO_4$. The evaporation of the solvent leads to the isolation of a yellow oil as two stereo isomers quantitatively.

C) Synthesis of t-butyl-trimethyl-fulvene

In a 500 ml flask is placed 12.60 g of the product obtained in step B and dissolved in 40 ml of methanol. The mixture is cooled down to −78° C. 2.15 g acetone in 10 ml of ethanol is added slowly. In the next step 4 g of pyrrolidine in 10 ml of methanol is added. After six hours the reaction is terminated by addition of 10 ml of acetic acid. After separation of organic phase, drying, evaporation of solvents and distillation an orange oil is obtained (8.95 g).

D) Synthesis of 2,2-[(3-t-butyl-methyl-cyclopentadienyl) fluorenyl]propane

In round bottom flask is placed 3.8 g fluorene in 100 ml of THF under nitrogen. 14.2 ml of methyl lithium in ether (1.6 mol) is added. The reaction mixture is stirred for 3 hours and then reacted with 4.70 g of the product obtained in step C dissolved in 10 ml of THF. The reaction is terminated after 8 hours by the addition of a saturated solution of NH₄Cl in water. The organic phase is separated, the solvents evaporated and 8.5 g of the title compound is obtained as an oily mixture of two principal isomonomers, 2,2-[(3-t-butyl-5-methyl-cyclopentadienyl)fluorenyl]propane and 2,2-[(3-t-butyl-2-methyl-cyclopentadienyl)fluorenyl]propane.

E) Synthesis of the mixture of isopropylidene(3-t-Bu-5-methyl-cyclopentadienyl fluorenyl)ZrCl₂ (1) and isopropylidene (3-t-Bu-2-methyl-cyclopentadienyl fluorenyl)ZrCl₂ (2)

2 g of the ligand obtained in step D is dissolved in 250 ml THF under nitrogen and reacted with 7.3 ml methyl lithium in ether (1.6 mol). The reaction mixture is stirred over night. The solvent is evaporated next day and the dianion of the ligand is isolated which is reacted with 3.8 g of ZrCl₄ in 200 ml ether at −78° C. The mixture is stirred for 6 hours at room temperature. The two isomers can be separated by solvent separation since (1) is less soluble in dichloromethane than (2).

Isopropylidene(3-t-butyl-5-methyl-cyclopentadienyl fluorenyl)ZrCl₂ is recovered, the structure of which is shown in FIG. 1.

hexane or isobutane with the quantities reported in the following Tables. Polymerisation was initiated by introducing metallocene (0.5 to 5 mg) pre-contacted with 1 ml of MAO (methylaluminoxane) (30% solution in toluene obtained from WITCO) three minutes prior to its introduction into the reactor.

Tables 1 and 2 show the results of polypropylene production using the catalyst system of Example 1. Entries 1 to 4 compare polymerisation of pure propylene (bulk-entry 1) with those using the diluents cyclohexane (entry 2) and isobutane at two different partial pressures of hydrogen (entries 3 and 4). The polymerisation temperature for each of these entries was 60° C. Entries 5 and 6 compare bulk propylene polymerisation at the higher temperatures of 70° C. and 80° C. respectively. It is apparent that a molecular weight of about 200,000 to about 450,000 was obtainable. Polypropylene having a melt temperature of at least 139° C. was obtained, in this case around 140° C. The polymers obtained exhibited monomodality on gel permeation chromatography (results not shown).

TABLE 1

Polymerization with iPr (5-Me-3-tBu-Cp Flu) ZrCl₂

| Entry | Pol. Temp (° C.) | Hourly prod. (gPP/gCat/h) | MI₂ (g/10 min) | Mn (Da) | Mw (Da) | Mz (Da) | D | D' | Melt. Temp (° C.) |
|---|---|---|---|---|---|---|---|---|---|
| 1 | 60 | 54,000 | 3.64 | 67,700 | 458,500 | 1,334,000 | 6.8 | 2.9 | 142.4 |
| 2 | 60 | 50,500 | 1.74 | 120,000 | 402,200 | 936,000 | 3.4 | 2.3 | 143.8 |
| 3 | 60* | 96,000 | 3.08 | 74,400 | 333,800 | 880,000 | 4.5 | 2.6 | 142.6 |
| 4 | 60** | 110,000 | 13.56 | 68,000 | 248,600 | 581,000 | 3.7 | 2.3 | 142.2 |
| 5 | 70 | 110,500 | 7.53 | 74,200 | 306,000 | 1,066,000 | 4.1 | 3.5 | 139.3 |
| 6 | 80 | 130,000 | 13.50 | 62,800 | 213,900 | 499,000 | 3.4 | 2.3 | 139.6 |

Key:
MI₂ = Melt index; Mn = number average molecular weight; Mw = weight average molecular weight;
D = Mw/Mn; D' = Mz/Mw
1. Bulk Propylene; 2. Slurry in Cyclohexane; 3. Slurry in isobutane
*0.25 Nl H2; **1 Nl H2

EXAMPLE 2

Synthesis of isopropylidene(3-t-butyl-2-methyl-cyclopentadienyl fluorenyl)ZrCl₂

Figure 2:
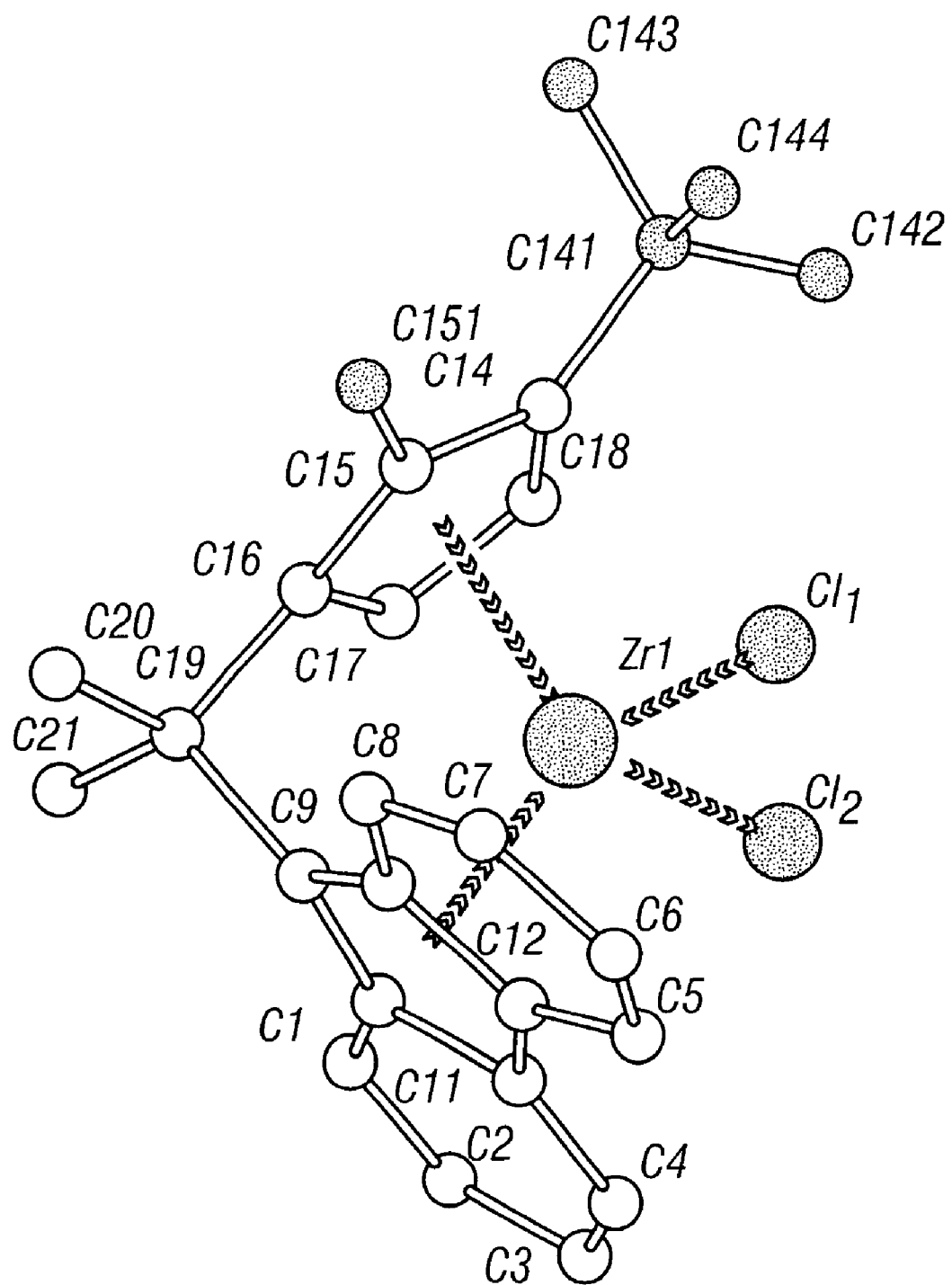
FIG. 2 shows an illustration of the three-dimensional structure of a preferred catalyst component of the present invention as obtained by X-ray diffraction analysis of isopropylidene (3-tert.butyl-2-methyl cyclopentadienyl-fluorenyl) $ZrC_2$.

The synthetic procedure according to Example 1 is followed except that, after solvent separation at the end of step E, isopropylidene(3-t-butyl-2-methyl-cyclopentadienyl fluorenyl)ZrCl₂ is recovered. The structure of this isomer is shown in FIG. 2.

EXAMPLE 3

Synthesis of mixture of isopropylidene(3-t-butyl-5-methylcyclopentadienyl fluorenyl)ZrCl₂ and isopropylidene(3-t-butyl-2-methylcyclopentadienyl fluorenyl)ZrCl₂

The synthetic procedure according to Example 1 is followed except that the step of solvent separation of the two isomers is omitted.

EXAMPLE 4

Polymerisation Procedures I

Each polymerisation was performed in a 4 liter bench reactor with pure propylene or with diluent such as cyclo- Table 2 shows the microtacticity of the polymer obtained using the catalyst according to Example 1 under polymerisation conditions as defined by the corresponding entries in Table 1. The results were obtained using ¹³C NMR spectroscopy. It will be apparent that the polypropylene contained more than 80% of pentads in the purely isotactic form (mmmm) and a virtually undetectable frequency of misinsertions.

Tables 3 and 4 show corresponding data in relation to the bulk polymerisation of propylene using the catalyst system of Example 2. The weight average molecular weight of the polypropylene in this case is much lower than for the polypropylene produced using the catalyst of Example 1. The melt temperatures reported in Table 3 are also lower than those in Table 1. Table 4 shows the microtacticity of the polymers of the two entries in Table 1 from which it will be apparent that the percentage of purely isotactic pentads is reduced as compared with those reported in Table 2. Importantly, a misinsertion frequency of up to 0.4% is found in Table 4 as compared with the virtually undetectable frequency of misinsertions reported in Table 2.

TABLE 2

Microtacticity with iPr (5-Me-3-tBu-Cp Flu) ZrCl$_2$

| Entry | mmmm % | mmmr % | mmrr % | mrrm % | inversion % | NMR Scans |
|---|---|---|---|---|---|---|
| 1 | 85.8 | 5.3 | 5.1 | 2.5 | not det. | 2224 |
| 2 | 86.8 | 5.2 | 4.7 | 2.3 | (1) | 4080 |
| 3 | 83.9 | 6.1 | 5.3 | 2.5 | (1) | 4344 |
| 4 | 84.0 | 5.8 | 5.2 | 2.5 | (1) | 2368 |
| 5 | 82.8 | 6.3 | 5.6 | 2.7 | / | 2272 |
| 6 | 83.8 | 6.2 | 5.4 | 2.4 | (1) | 7128 |

(1) inversions observed but too low to be quantified.

TABLE 3

Bulk polymerization with iPr (2-Me-3-tBu-Cp Flu) ZrCl$_2$

| Entry | Pol. Temp (° C.) | Hourly prod. (gPP/gCat/h) | Mn (Da) | Mw (Da) | Mz (Da) | D | D' | Melt. Temp (° C.) |
|---|---|---|---|---|---|---|---|---|
| 1 | 40 | 179,000 | 37,400 | 96,600 | 409,000 | 2.6 | 4.2 | 101.4 |
| 2 | 60 | 99,000 | 22,100 | 73,800 | 431,000 | 3.3 | 5.8 | 110.9 |

Key:
MI$_2$ = Melt index; Mn = number average molecular weight; Mw = weight average molecular weight; D = Mw/Mn; D' = Mz/Mw

TABLE 4

Microtacticity with iPr (2-Me-3-tBu-Cp Flu) ZrCl$_2$

| Entry | Pol. Temp. (° C.) | mmmm % | mmmr % | mmrr % | mrrm % | Inv. % | NMR Scans |
|---|---|---|---|---|---|---|---|
| 1 | 40 | 61.1 | 12.3 | 13.4 | 6.0 | 0.2–0.4 | 5000 |
| 2 | 60 | 69.3 | 10.6 | 10.3 | 4.9 | 0.1–0.2 | 3976 |

TABLE 5

Bulk polymerization with the mixture of isomers
iPr (2-Me-3-tBu-Cp Flu) ZrCl$_2$ + iPr (5-Me-3-tBu-Cp Flu) ZrCl$_2$

| Entry | Pol. Temp (° C.) | Hourly prod. (gPP/gCat/h) | Mn (Da) | Mw (Da) | Mz (Da) | D | D' | Melt. Temp (° C.) |
|---|---|---|---|---|---|---|---|---|
| 1 | 40 | 2,250 | 27,800 | 336,700 | 1,524,000 | 12.1 | 4.5 | 133.1 |
| 2 | 60 | 5,200 | 45,700 | 255,000 | 906,800 | 5.6 | 3.6 | 136.7 |

Figure 3:
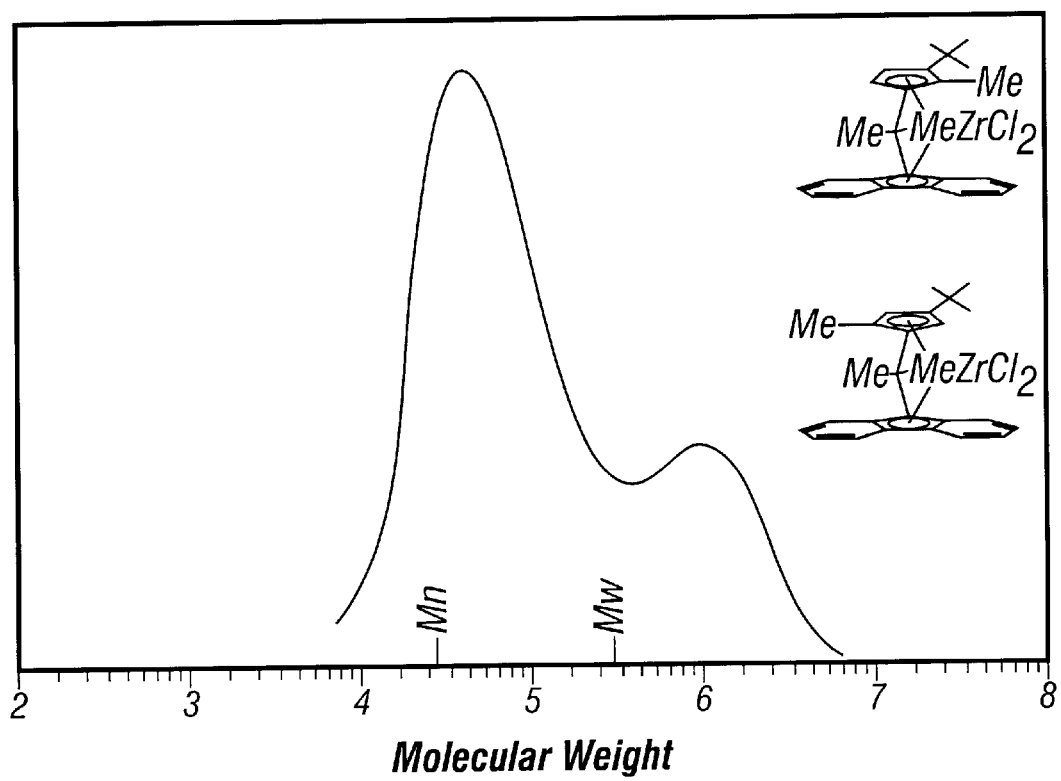
FIG. 3 shows the results of gel permeation chromatography on isotactic polypropylene produced at 40° C. using a mixture of the isomers shown in FIGS. 1 and 2 as a catalyst component.
Figure 4:
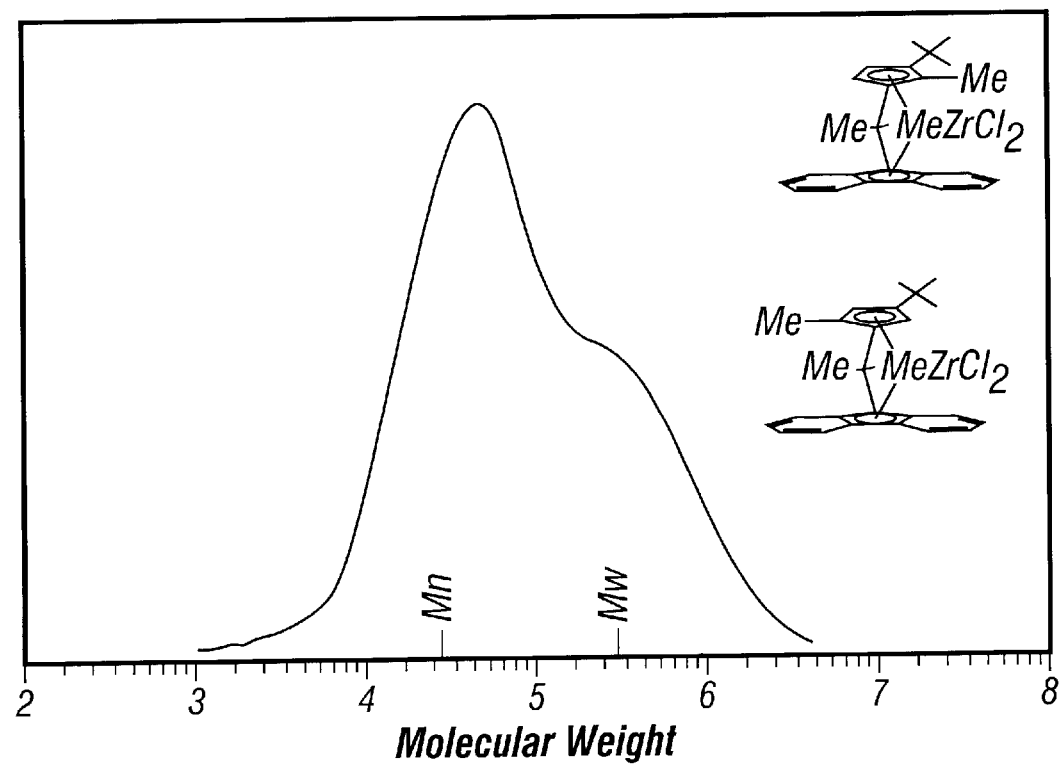
FIG. 4 shows the results of gel permeation chromatography on isotactic polypropylene produced at 60° C. using a mixture of the isomers shown in FIGS. 1 and 2 as a catalyst component.

Key:
MI$_2$ = Melt index; Mn = number average molecular weight; Mw = weight average molecular weight; D = Mw/Mn; D' = Mz/Mw Tables 5 and 6 show the results of corresponding bulk propylene polymerisation with a mixture of the two isomers from Examples 1 and 2. These polymers have relatively high melt temperatures. However, unlike the polymers reported in Table 1 using the single isomer isopropylidene (3-t-butyl-5-methylcyclopentadienyl fluorenyl)ZrCl$_2$ which exhibits monomodality on gel permeation chromatography, polymers produced using the mixture of isomers exhibit bimodality. This is apparent from FIGS. 3 and 4 which show respectively the results of gel permeation chromatography on the polymers of entries 1 and 2 of Table 5.

Table 6 shows steric pentad concentrations and regiodefects concentrations.

TABLE 6 iPr (2-Me-3-tBu-Cp Flu) ZrCl$_2$ + iPr (5-Me-3-tBu-Cp Flu) ZrCl$_2$

| Entry | Pol. Temp (° C.) | mmmm % | mmmr % | mmrr % | mrrm % | Inv. % |
|---|---|---|---|---|---|---|
| 1 | 40 | 62.0 | 10.6 | 11.8 | 4.8 | 0.3 |
| 2 | 60 | 74.3 | 8.2 | 8.17 | 3.65 | nd |

EXAMPLE 5:

Synthesis of dimethylsilyl(2,5-dimethyl-3-t-butyl-cyclopentadienyl fluorenyl)zirconium dichloride
Formula: Me$_2$Si(2,5-Me$_2$-3-tBu-Cp flu)ZrCl$_2$
C$_{26}$H$_{30}$SiZrCl$_2$
Mw: 532.68

A. Preparation of 1,3-dimethylcyclopentadiene
Reaction:

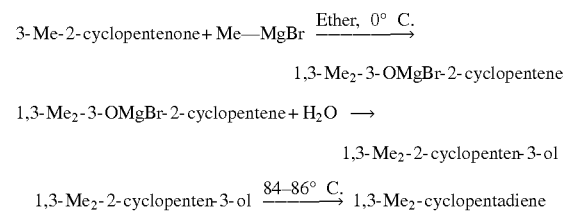

Procedure

In a flask under nitrogen, were placed 200 ml (0.6 mol.) of methylmagnesium bromide (3.0 molar in ether) and 200 ml of dry ether at 0° C. Then a solution of 49.19 g (0.5117 mol.) of 3-methyl-2-cyclopentenone in 50 ml of dry ether was added dropwise to this solution. After a stirring period (one hour), the reaction mixture was yellow-red. The reaction was further continued at room temperature for 24 hours. The reaction mixture was treated with 500 ml of water cooled to 0° C. After separation and drying over anhydrous MgSO$_4$, the solvent of the organic phase was removed in vacuo (500–550 mbars) to room temperature. The viscous red oil was distilled and collected at −78° C. Fractional distillation at 84–86° C. yielded 24.10 g (50.14%) of a clear colorless liquid, containing a small quantity (ca. 5%) of 1-methylcyclopentadiene.

B. Preparation of 1,3,6,6-tetramethylfulvene
Reaction

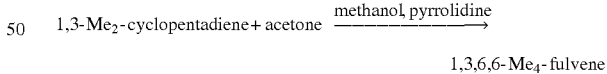

Procedure

In a 250 ml flask, under nitrogen, were placed 50 ml of methanol at −78° C. Then 24.10 g (0.256 mol.) of 1,3-dimethylcyclopentadiene was added to the methanol. After that, a solution of 7.5 ml (0.102 mol.) of acetone in 25 ml of methanol was added dropwise to this solution. Finally, a solution of 12.8 ml (0.154 mol.) of pyrrolidine in 25 ml of methanol was added dropwise to the reaction mixture. After an hour, the reaction mixture was red and the reaction was further continued for 2 days. After neutralization with 10 ml of acetic acid and 50 ml of water, the reaction mixture was separated and dried over anhydrous MgSO$_4$. The solvent of the organic phase was removed in vacuo (10−2 mbar) and yielded 15.62 g (45.45%) of a clear red liquid.

C. Preparation of 1-t-butyl-2,4-dimethyl cyclopentadiene

Reaction

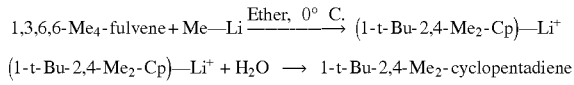

Procedure

In a 1 liter flask, under nitrogen, were placed 200 ml of dry ether and 15.20 g (0.113 mol.) of 1,3,6,6-tetramethylfulvene. The yellow solution was cooled to 0° C. Then, a solution of 70.8 ml (0.113 mol.) of methyllithium (1.6 molar in ether) was added dropwise to this solution. The reaction was further continued at room temperature for 24 hours. The reaction mixture was treated with 50 ml of solution of $NH_4Cl$ (saturated) After separation and drying over anhydrous $MgSO_4$, the solvent of the organic phase was removed in vacuo (10–2 mbar) and yielded 13.21 g (77.63%) of a clear yellow oil.

D. Preparation of chlorodimethyl-(9-fluorenyl)silane

Reaction fluorene + Me—Li $\xrightarrow[0°\ C.]{Ether}$ fluorenyllithium fluorenyllithium + $Me_2SiCl_2$ $\xrightarrow{Hexane}$ chlorodimethyl-(9-fluorenyl)silane Procedure Into a 3000 ml flask, under nitrogen, was placed a solution of dichlorodimethyl silane (80.2 ml, 0.64 mol.) in 1000 ml of dry hexane, and the solution was Dre-cooled to −78° C. A suspension of fluorenyllithium (53.13 g, 0.32 mol.) in 2000 ml of hexane was slowly added via a cannula and the reaction mixture was stirred for an additional one hour at this temperature. The resulting mixture was gradually allowed to warm to room temperature and stirred for another 16 hours. The reaction mixture was then filtered under nitrogen, through a Celite plug (250 ml). The filtrate was concentrated and kept at −20° C. overnight. The resulting light-green crystals were recrystallised from hexane at −20° C. to afford 75.09 g (90.68 % yield) of chlorodimethyl-(9-fluorenyl)silane.

E. Preparation of (2,5-dimethyl-3-t-butyl)-dimethyl-(9-fluorenyl)silane

Reaction

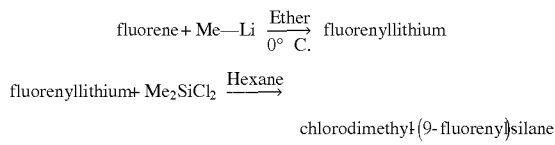

Procedure

Into a 1000 ml flask, under nitrogen, was placed 10 g of 1-t-Bu-2,4-Me₂-Cp in 250 ml of dry tetrahydrofuran, and the solution was pre-cooled to 0° C. Then, a solution of 41.6 ml (0.0666 mol.) of methyllithium was added dropwise to the solution. After a stirring period, the reaction mixture was white. The reaction was further continued at room temperature for 4 hours. After that, a solution of 17.22 g (0.0666 mol.) of chlorodimethyl-(9-fluorenyl)silane in 80 ml of dry tetrahydrofuran was added dropwise to this solution. The reaction was further continued for 24 hours. The solvent of the organic phase was removed in vacuo (10–2 mbar) at 40° C. for 3 hours. The ligand was extracted with 2×300 ml of n-pentane. After filtration, the n-pentane was removed in vacuo at 40° C. and yielded 23.75 g (95.72%) of a clear brown oil.

F. Preparation of dimetchylsilyl(2,5-dimethyl-3-t-butyl-cyclopentadienyl)(flyorenyl)zirconium dichchloride Reaction

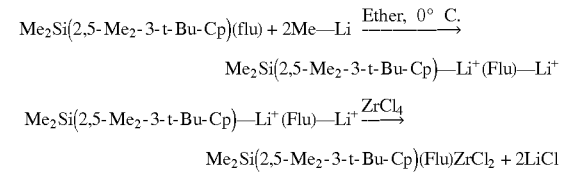

Procedure

In a 500 ml flask, under nitrogen, was placed 10 g of ligand in 100 ml of dry diethylether. The solution was pre-cooled to 0 °C. A solution of 33.5 ml (0.0537 mol.) of methyllithium (1.6 molar/diethylether) was added dropwise to this solution. After a stirring period (24 hours), the solvent was removed in vacuo. The red powder was washed with 200 ml of pentane and yielded 12.4 g of a red power. Into a 500 ml flask, was placed the red dianion ligand, in 200 ml of pentane. 6.5 g (0.027 mol.) of zirconium tetrachloride was added to this suspension. The mixture was red-brown and the reaction was further continued for 24 hours in a glove box. After washing and filtration, the red powder was solubilised in 100 ml of dichloromethane. The solution was filtered and the filtrate was removed in vacuo and yielded 13.2 g (92.3%) of orange powder.

EXAMPLE 6

Polymerisation Procedures II

Each polymerisation was performed in a 4 liter bench reactor with pure propylene or with diluent such as cyclohexane or isobutane with the quantities reported in the following Tables. Polymerisation was initiated by introducing metallocene (0.5 to 5 mg) precontacted with 1 ml of MAO (methylaluminoxane) (30% solution in toluene obtained from WITCO) three minutes prior to its introduction into the reactor.

Tables 7 and 8 show the results of polypropylene production using the catalyst of Example 5. Entries 1 to 4 compare polymerisation of pure polypropylene (bulk-entry 1) with those using the diluents cyclohexane (entry 2) and isobutane at two different partial pressures of hydrogen (entries 3 and 4). The polymerisation temperature for each of these entries was 600C. It is apparent that a molecular weight of about 50,000 to about 150,000 was obtainable. Polypropylene having a melt temperature of at least 141° C. was obtained. The polymers obtained exhibited monomodality on gel permeation chromatography (results not shown).

Table 8 shows the microtacticity of the polymer obtained using the catalyst according to Example 5 under polymerisation conditions as defined by the corresponding entries in Table 7. The results were obtained using $^{13}C$ NMR spectroscopy. It will be apparent that the polypropylene contained more than 84% of pentads in the purely isotactic form (mmmm) and a virtually undetectable frequency of misinsertions.

TABLE 7

Bulk Polymerization with 1-dimethylsilyl-(3-t-butyl 2, 5-dimethylcylopentadienylp fluorenyl) zirconium dichloride

| Entry | Pol Temp (° C.) | Hourly Prod. (gPP/gCat/h) | MFI (g/10 min) | Mn (KDa) | Mw (KDa) | Mz (KDa) | D | D' | Melt Temp (° C.) |
|---|---|---|---|---|---|---|---|---|---|
| 1 | 60 | 19.500 | 51.6 | 22.7 | 83.8 | 648.5 | 3.7 | 7.7 | 145.4 |
| 2 | 60 | 11.950 | 21.43 | 56.3 | 143.0 | 322.2 | 2.5 | 2.3 | 147.9 |
| 3 | 60 | 21.400 | Too high | 21.5 | 65.2 | 153.8 | 3.0 | 2.4 | 145.0 |
| 4 | 80 | 18.300 | Too high | 10.8 | 37.0 | 77.9 | 3.4 | 2.1 | 141.3 |

Key:
MFI—Melt Flow Index, Mn = number average molecular weight, Mw = weight average molecular weight
D = Mw/Mn; D' = Mz/Mw

TABLE 8

Microtacticity with Me$_2$Si (3-tBu-2,5-dimethylene) FluZrCl$_2$

| Entry | Pol Temp | mmmm % | mmmr % | mmrr % | mrrm % | Inversion % | NMR Scans |
|---|---|---|---|---|---|---|---|
| 1 | 60° C. | 89.3 | 3.6 | 3.4 | 1.6 | 0.11 | 4728 |
| 2 | 60° C. | 88.9 | 3.8 | 3.2 | 1.6 | (1) or (2) | 5840 |
| 3 | 60° C. | 86.1 | 4.8 | 3.9 | 1.9 | (1) or (2) | 1848 |
| 4 | 80° C. | 84.8 | 5.3 | 4.2 | 2.1 | (1) | 4236 |

(1) Inversions observed but too low to be quantified
(2) Not observed

What is claimed is:

1. A metallocene catalyst component for use in preparing isotactic polyolefins, which comprises (i) a catalyst component of the general formula:

R"CpR$^1$R$^2$R$^3$)(Cp'R'$_n$)MQ$_2$ wherein Cp is a substituted cyclopentadienyl ring; Cp' is a substituted or unsubstituted fluorcarbonyl ring; R" is a structural bridge imparting stereorigidity to the component; R$^1$ is a substituent on the cyclopentadienyl ring which is distal to the bridge, which distal substituent comprises a group of the formula XR'$_3$, in which X is chosen from Group IVA, and each R* is the same or different and chosen from hydrogen or hydrocarbyl of from 1 to 20 carbon atoms, R$^2$ is a substituent on the cyclopentadienyl ring which is proximal to the bridge and positioned non-vicinal to the distal substituent, and is of the formula YR$^\#_3$, in which Y is chosen from Group IVA, and each R$^\#$ is the same or different and chosen from hydrogen or hydrocarbyl of 1 to 7 carbon atoms, R$^3$ is a substituent on the cyclopentadienyl ring which is proximal to the bridge and is hydrogen atom or is of the formula ZR$^\$_3$, in which Z is chosen from the Group IVA, and each R$^\$$ is the same or different and chosen from hydrogen or hydrocarbyl of 1 to 7 carbon atoms, each R' is the same or different and is hydrocarbyl of 1 to 20 carbon atoms in which $0 \leq n \leq 8$; M is a Group IVB transition metal or vanadium; and each Q is hydrocarbyl having 1 to 20 carbon atoms or is a halogen; and (ii) a regioisomer thereof in which R$^2$ is proximal to the bridge and positioned vicinal to the distal substituent.

2. A metallocene catalyst component according to claim 1, wherein R$^1$ is C(CH$_3$)$_3$, C(CH$_3$)$_2$Ph, CPh$_3$ or Si(CH$_3$)$_3$.

3. A metallocene catalyst component according to claim 2, wherein R$^1$ is C(CH$_3$)$_3$.

4. A metallocene catalyst component according to claim 1, wherein R$^*$ is alkyl, aryl, alkenyl, alkylaryl or aryl alkyl.

5. A metallocene catalyst component according to claim 4, wherein R$^*$ is methyl, ethyl, propyl, isopropyl, butyl, isobutyl, amyl, isoamyl, hexyl, heptyl, octyl, nonyl, decyl, cetyl or phenyl.

6. A metallocene catalyst component according to claim 1, wherein is alkyl, aryl, alkenyl, alkylaryl or aryl alkyl and may be the same or different.

7. A metallocene catalyst component according to claim 6, wherein R' is methyl, ethyl, propyl, isopropyl, butyl, isobutyl, amyl, isoamyl, hexyl, heptyl, octyl, nonyl, decyl, cetyl or phenyl.

8. A metallocene catalyst component according to claim 1, wherein X is carbon or silicon.

9. A metallocene catalyst component according to claim 1, wherein Y is carbon.

10. A metallocene catalyst component according to claim 1, wherein Z is carbon.

11. A metallocene catalyst component according to claim 1, wherein R$^2$ is CH$_3$.

12. A metallocene catalyst component according to claim 1, wherein R$^3$ is CH$_3$.

13. A metallocene catalyst component according to claim 1, wherein R" is alkylidene having 1 to 20 aliphatic or aromatic carbon atoms, a dialkyl germanium or silicon or siloxane, alkyl phosphene or amine.

14. A metallocene catalyst component according to claim 13, wherein R" is isopropylidene or dimethylsilanediyl.

15. A metallocene catalyst component according to claim 1, wherein M is zirconium or titanium.

16. A metallocene catalyst component according to claim 1, wherein Q is halogen.

17. A metallocene catalyst component according to claim 1, wherein Q is alkyl, aryl, alkenyl, alkylaryl or aryl alkyl.

18. A metallocene catalyst component according to claim 17, wherein Q is methyl, ethyl, propyl, isopropyl, butyl, isobutyl, amyl, isoamyl, hexyl, heptyl, octyl, nonyl, decyl, cetyl or phenyl.

19. A metallocene component according to claim 1, wherein the fluorenyl ring is unsubstituted at both positions 4 and 5.

20. A metallocene catalyst component, according to claim 1, which further comprises an aluminum co-catalyst or boron containing co-catalyst capable of activating the catalyst component.

21. A metallocene catalyst component according to claim 20 wherein the aluminum containing co-catalyst is an alumoxane, an alkyl aluminum, a Lewis acid or combinations thereof.

22. A metallocene catalyst component according to claim 21 wherein the aluminum containing co-catalyst is an oligomeric linear alumoxane of the formula:

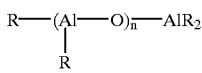

or an oligomeric cylic alumoxane of the formula:

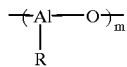

wherein n is 1–40, preferably 10–20, m is 3–40, preferably 3–20 and R is a $C_1$–$C_8$ alkyl group.

23. A metallocene catalyst component according to claim 22 wherein R is methyl.

24. A metallocene catalyst component according to claim 20 wherein the boron containing co-catalyst is a triphenyl-carbenium boronate.

25. A metallocene catalyst component according to claim 24 wherein the boron containing co-catalyst is a tetrakis-pentafluorophenyl-borato-triphenylcarbenium.

26. A metallocene catalyst component according to claim 1, which further comprises an inert support.

27. A metallocene catalyst component according to claim 26 where the support is a porous solid.

28. A metallocene catalyst component according to claim 27 where the support is talc, inorganic oxide or polyolefin resin.

29. A metallocene catalyst component according to claim 28 wherein the support is a finely divided inorganic oxide.

30. A metallocene catalyst component according to claim 29 wherein the support is a Group 2a, 3a, 4a or 4b metal oxide.

31. A metallocene catalyst component according to claim 30 wherein the support is a silica, alumina and mixtures thereof.

32. A metallocene catalyst component according to claim 30 wherein the support is magnesia, titania, zirconia, alone or in mixtures with silica or alumina.

33. A metallocene catalyst component according to claim 31 wherein support is silica having a surface area between 200 and 700 $m^2$/g and a pore volume between 0.5 and 3 $m^2$/g.

34. A metallocene catalyst component according to claim 28 wherein the support is finely divided polyethylene.

35. A metallocene catalyst component according to claim 20 wherein the aluminum to transition metal mole ratio is between 1:1 and 100:1.

36. A metallocene catalyst component according to claim 35 wherein the aluminum to transition metal mole ratio is between 5:1 and 50:1.

37. A metallocone catalyst component according to claim 26, which further comprises a hydrocarbon solvent of 4 to 7 carbon atoms.

38. A metallocene catalyst component according to claim 37 wherein the hydrocarbon solvent is heptane, toluene or cyclohexane.

39. A metallocene catalyst component for use in preparing isotactic polyolefins, which comprises isopropylidene-(3-t-butyl-5-methyl-cyclopentadienyl fluorenyl) $ZrCl_2$ and isopropylidene-(3-t-butyl-2-methylcyclopentadienyl fluorenyl) $ZrCl_2$.

40. A process of making a catalyst comprising:
a) contacting (i) a catalyst component of the general formula:

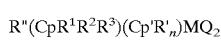

wherein Cp is a substituted cyclopentadienyl ring; Cp' is a substituted or unsubstituted fluorenyl ring; R" is a structural bridge imparting stereorigidity to the component; $R^1$ is a substituent on the cyclopentadienyl ring which is distal to the bridge, which distal substituent comprises a group of the formula $XR^*_3$, in which X is chosen from Group IVA, and each $R^*$ is the same or different and chosen from hydrogen or hydrocarbyl of from 1 to 20 carbon atoms, $R^2$ is a substituent on the cyclopentadienyl ring which is proximal to the bridge and positioned non-vicinal to the distal substituent, and is of the formula $YR^\#_3$, in which Y is chosen from Group IVA, and each $R^\#$ is the same or different and chosen from hydrogen or hydrocarbyl of 1 to 7 carbon atoms, $R^3$ is a substituent on the cyclopentadicnyl ring which is proximal to the bridge and is hydrogen atom or is of the formula $ZR^S_3$, in which Z is chosen from the Group IVA, and each $R^\#$ is the same or different and chosen from hydrogen or hydrocarbyl of 1 to 7 carbon atoms, each R' is the same or different and is hydrocarbyl of 1 to 20 carbon atoms in which $0 \leq n \leq 8$; M is a Group IVB transition metal or vanadium; and each Q is hydrocarbyl having 1 to 20 carbon atoms or is a halogen; and (ii) a regioisomer thereof in which $R^2$ is proximal to the bridge and positioned vicinal to the distal substituent; and b) activating the catalyst components with a co-catalyst.

41. The process of making a metallocene catalyst, according to claim 40, wherein $R^1$ is $C(CH_3)_3$, $C(CH_3)_2Ph$, $CPh_3$ or $Si(CH_3)_3$.

42. The process of making a metallocene catalyst according to claim 40, wherein $R^1$ is $C(CH_3)_3$.

43. The process of making a metallocene catalyst according to claim 40, wherein $R^*$ is alkyl, aryl, alkenyl, alkylaryl or aryl alkyl.

44. The process of making a metallocene catalyst according to claim 43, wherein $R^*$ is methyl, ethyl, propyl, isopropyl, butyl, isobutyl, amyl, isoamyl, hexyl, heptyl, octyl, nonyl, decyl, cetyl or phenyl.

45. The process of making a metallocene catalyst according to claim 40, wherein R' is alkyl, aryl, alkenyl, alkylaryl or aryl alkyl and may be the same or different.

46. The process of making a metallocene catalyst according to claim 45, wherein R' is methyl, ethyl, propyl, isopropyl, butyl, isobutyl, amyl, isoamyl, hexyl, heptyl, octyl, nonyl, decyl, cetyl or phenyl.

47. The process of making a metallocene catalyst according to claim 40, wherein X is carbon or silicon.

48. The process of making a metallocene catalyst according to claim 40, wherein Y is carbon.

49. The process of making a metallocene catalyst according to claim 40, wherein Z is carbon.

50. The process of making a metallocene catalyst according to claim 40, wherein $R^2$ is $CH_3$.

51. The process of making a metallocene catalyst according to claim 40, wherein $R^3$ is $CH_3$.

52. The process of making a metallocene catalyst according to claim 40, wherein R" is alkylidene having 1 to 20 aliphatic or aromatic carbon atoms, a dialkyl germanium or silicon or siloxane, alkyl phosphene or amine.

53. The process of making a metallocene catalyst according to claim 52, wherein R" is isopropylidene or dimethyl-silanediyl.

54. The process of making a metallocene catalyst according to claim 40, wherein M is zirconium or titanium.

55. The process of making a metallocene catalyst according to claim 40, wherein Q is halogen.

56. The process of making a metallocene catalyst according to claim 40, wherein Q is alkyl, aryl, alkenyl, alkylaryl or aryl alkyl.

57. The process of making a metallocene catalyst according to claim 56, wherein Q is methyl, ethyl, propyl, isopropyl, butyl, isobutyl, amyl, isoamyl, hexyl, heptyl, octyl, nonyl, decyl, cetyl or phenyl.

58. The process of making a metallocene catalyst according to claim 40, wherein the fluorenyl ring is unsubstituted at both positions 4 and 5.

59. The process of making a metallocene catalyst according to claim 40, wherein the co-catalyst is an aluminum containing co-catalyst or a boron containing co-catalyst capable of activating the catalyst component.

60. The process of making a metallocene catalyst according to claim 59 wherein the aluminum containing co-catalyst is an alumoxane, an alkyl aluminum, a Lewis acid or combination thereof.

61. The process of making a metallocene catalyst according to claim 60 wherein the aluminum containing co-catalyst is an oligomeric linear alumoxane of the formula:

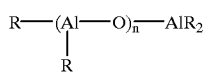

or an oligomeric cylic alumoxane of the formula:

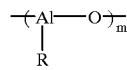

wherein n is 1–40, preferably 10–20, m is 3–40, preferably 3–20 and R is a $C_1$–$C_8$ alkyl group.

62. The process for making a metallocene catalyst according to claim 61 wherein R is methyl.

63. The process making a metallocene catalyst according to claim 59 wherein the boron containing co-catalyst is a triphenylcarbenium boronate.

64. The process for making a metallocene catalyst according to claim 63 wherein the boron containing co-catalyst is a tetrakis-pentafluorophenyl-borato-triphenylcarbenium.

65. The process for making a metallocene catalyst according to claim 40, which further comprises supporting the catalyst on an inert support.

66. The process for making a metallocene catalyst according to claim 65 where the support is a porous solid.

67. The process for making a metallocene catalyst according to claim 66 where the support is talc, inorganic oxide or polyolefin resin.

68. The process for making a metallocene catalyst according to claim 67 wherein the support is a finely divided inorganic oxide.

69. The process for making a metallocene catalyst according to claim 68 wherein the support is a Group 2a, 3a, 4a or 4b metal oxide.

70. The process for making a metallocene catalyst according to claim 69 wherein the support is a silica, alumina and mixtures thereof.

71. The process for making a metallocene catalyst according to claim 69 wherein the support is magnesia, titania, zirconia, alone or in mixtures with silica or alumina.

72. The process for making a metallocene catalyst according to claim 70 wherein the support is silica having a surface area between 200 and 700 $m^2/g$ and a pore volume between 0.5 and 3 $m^2/g$.

73. The process of making a metallocene catalyst according to claim 66 wherein support is finely divided polyethylene.

74. The process for making a metallocene catalyst according to claim 59 wherein the aluminum to transition metal mole ratio is between 1:1 and 100:1.

75. The process for making a metallocene catalyst according to claim 74 wherein the aluminum to transition metal mole ratio is between 5:1 and 50:1.

76. The process for making a metallocene catalyst according to claim 65 which further comprises a hydrocarbon solvent of 4 to 7 carbon atoms.

77. The process for making a metallocene catalyst according to claim 74 wherein hydrocarbon solvent is heptane, toluene or cyclohexane.

78. The process for making a metallocene catalyst according to claim 40 wherein an alumoxane is dissolved in a hydrocarbon solvent; an inert support is slurried in a hydrocarbon solvent; the alumoxane dissolved in the hydrocarbon solvent is added to the inert support slurried in the hydrocarbon solvent; and the metallocene catalyst component is added to the slurry.

79. process for making a metallocene catalyst according to claim 78 wherein the solvent is mineral oil, alkane, cycloalkane or aromatic.

80. The process for making a metallocene catalyst according to claim 79 wherein the solvent is pentane, isopesentane, hexane, heptane, octane, nonane, cyclopentane, cyclohexane, benzene, toluene, ethylbenzene and diethylbenzene.

81. The process for making a metallocene catalyst according to claim 80 wherein the solvent is toluene.

* * * * *